No. 655,065. Patented July 31, 1900.
E. DETWILER.
STEAM GENERATING AND WATER HEATING DEVICE.
(Application filed Dec. 8, 1899.)
(No Model.) 2 Sheets—Sheet 1.

Witnesses:
Geo. W. Young.
B. C. Roloff.

Inventor
Emanuel Detwiler
By H. G. Underwood
Attorney

No. 655,065. Patented July 31, 1900.
E. DETWILER.
STEAM GENERATING AND WATER HEATING DEVICE.
(Application filed Dec. 8, 1899.)
(No Model.) 2 Sheets—Sheet 2.

Witnesses:
Geo W Truny
B. C. Roloff.

Inventor:
Emanuel Detwiler
By H. G. Underwood
Attorney

UNITED STATES PATENT OFFICE.

EMANUEL DETWILER, OF MILWAUKEE, WISCONSIN.

STEAM-GENERATING AND WATER-HEATING DEVICE.

SPECIFICATION forming part of Letters Patent No. 655,065, dated July 31, 1900.

Application filed December 8, 1899. Serial No. 739,608. (No model.)

*To all whom it may concern:*

Be it known that I, EMANUEL DETWILER, a citizen of the United States, and a resident of Milwaukee, in the county of Milwaukee and State of Wisconsin, have invented certain new and useful Improvements in Steam-Generating and Water-Heating Devices; and I do hereby declare that the following is a full, clear, and exact description thereof.

My invention relates to devices employed for the generation of steam and for the rapid heating of water, and is, in part, an improvement on the device shown in my prior patent, No. 553,110, granted to me January 14, 1896; and it consists in certain peculiarities of construction and combination of parts, as will be fully set forth hereinafter and subsequently claimed.

Figure 1:
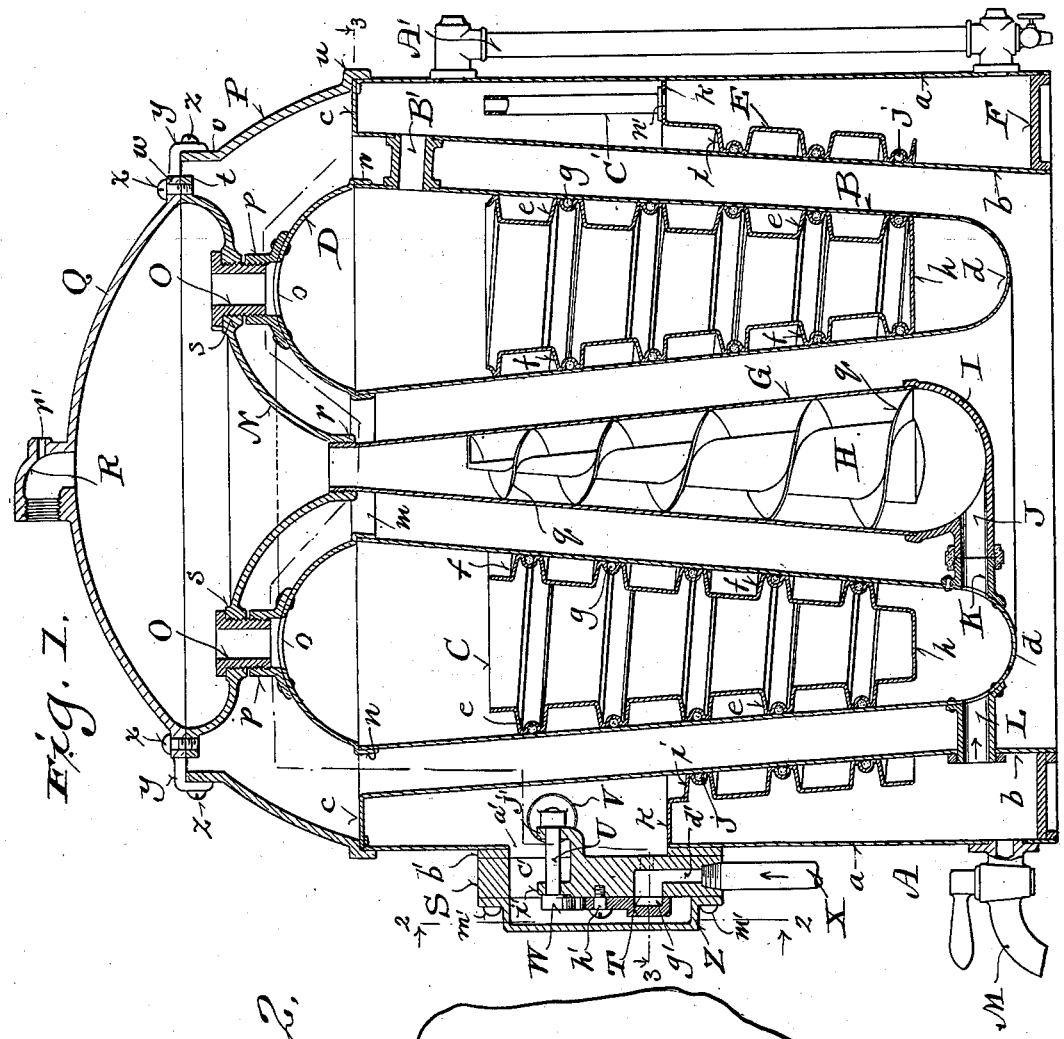
Figure 2:
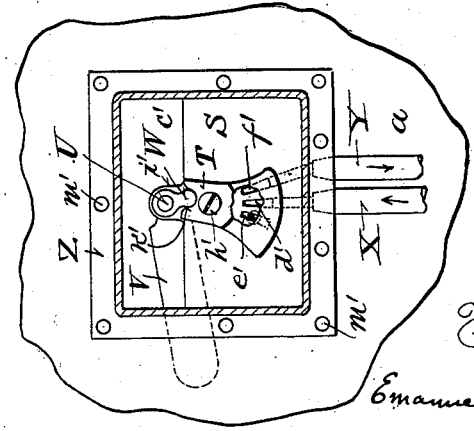
Figure 3:
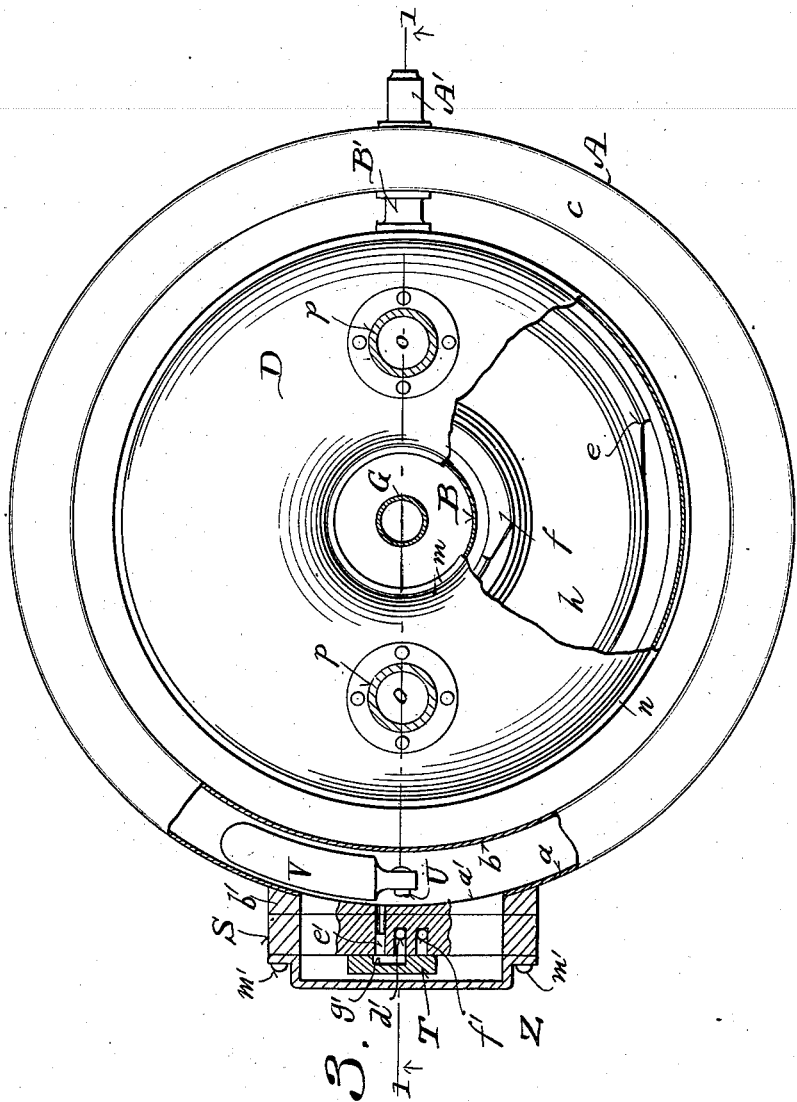

In the drawings, Figure 1 is a vertical central sectional view of a heater embodying my present invention, taken on the line 1 1 of Fig. 3. Fig. 2 is a detail view illustrating the exterior of a valve forming part of said invention, said view being partly broken away and partly in section on the line 2 2 of Fig. 1. Fig. 3 is a view of my improved device, partly in plan and partly in section on the line 3 3 of Fig. 1, with portions of said device removed and other parts broken away to better illustrate certain details of construction.

I will first describe my invention as arranged for the generation of steam, the arrangement being shown in detail in the accompanying drawings.

Referring to the said drawings, $a$ represents the outer cylindrical or vertical wall, and $b$ the inner inclined wall, of a double-walled hollow annular casing A, closed at the upper end, as shown, by the annular horizontal top wall $c$. B represents a conical annular double-walled pot secured within said outer casing in any suitable manner. This pot has a central vertical opening which is itself conical, so that the described annular walls of said pot converge from top to bottom, as shown, said walls coming together at the bottom on a rounded line, as shown at $d$, but being originally open at the top for the reception of the annular coil-shell C, after which the top of the pot B is closed by the annular dome D, hereinafter described. The annular coil-shell C is preferably stamped out of sheet-copper and is likewise a conical double-walled device, the exterior surfaces of each of said walls of said shell being formed with a continuous spiral coil, as shown at $e$ and $f$, respectively, the outer edge of each spiral coil being formed with a continuous semicircular groove to receive a continuous packing-cord $g$, and thereby insure fluid-tight joints when the annular coil-shell C has been driven to place within the annular pot B. The bottom of this double-walled shell is closed, as shown at $h\ h$, but the top is left open and in communication with the upper part of the described annular pot B. E represents an annular conical band, likewise preferably stamped out of sheet-copper, whose inner surface is formed with a similar continuous spiral coil $i$, the edge of said coil being formed with a continuous semicircular groove for the reception of a continuous packing-cord $j$, and this annular conical band E is inserted into the space between the walls $a\ b$ of the hollow annular casing A from the bottom and driven up to place until the outturned upper edge $k$ of said band is in contact with the wall $a$ of said casing and the spiral coil $i$ in contact with the inner inclined casing-wall $b$, after which the said band E is made fast in any suitable way, and then the lower end of the said annular casing A is closed by a proper base-ring F.

The annular dome D, hereinbefore referred to, is semicircular in cross-section and has a central opening and inner and outer base-flanges $m\ n$, which fit over and are properly secured to the inner and outer walls of the described annular pot B and close the top of said pot. The said dome is further formed with two openings $o\ o$, guarded by collars $p\ p$, having annular base-flanges secured to the exterior top of the dome, said collars being formed with interior screw-threads.

G is a conical shell open at the top, located in the central annular conical space of the pot B, said open top projecting above the plane of the top of said pot B, and the upper end of said shell G being cylindrical and provided with exterior screw-threads. H is a cone whose exterior surface is provided with a continuous spiral coil $q$, which is driven up within the said shell G from the bottom thereof, so that the edge of said coil $q$ may have a fluid-tight fit in said shell G, and after the said coil is properly secured a base I is secured to the lower edge of the shell G, said base having an inlet pipe or passage J communicating with its interior and also communicating with a pipe K, leading from an opening in the adjacent inner wall of the pot B. L is another pipe, preferably in line with pipe K, extending between openings in the outer wall of pot B and the inner wall $b$ of casing A, and M is a drain-cock communicating with an opening in the lower part of the outer wall $a$ of said casing A.

N is a cup or annular band of a generally ogee shape in cross-section, having a central opening whose walls constitute a short cylindrical tube, as shown at $r$, provided with interior screw-threads for engagement with the threaded cylindrical upper end of the shell G, and said cup or band N is further formed with two circular openings whose walls are thickened and provided with interior screw-threads, as shown at $s\,s$, whereby when the said cup or band N has been screwed to the said shell G the walls of the said cup-openings will be in line with the described collars $p\,p$, which surround the openings $o\,o$ in the dome D. The upper edge of the cup or band N terminates in a horizontal annular flange $t$.

O O represent sleeves formed with exterior screw-threads and upper exterior annular flanges, and when the openings in the dome D and cup or band N are in line with each other the said sleeves are screwed to place, their threads engaging with the interior screw-threads in the collars $p$ and walls $s$ of the openings in said cup or band N, the described flanges on said sleeves O bearing on the upper surface of said cup or band and securing all these parts firmly together, as shown in Fig. 1. P represents another annular band which has a base-flange $u$, fitting against and resting on the upper outer edge of the casing A, and an upper vertical flange $v$, which surrounds the flange $t$ of the cup or band N at some little distance therefrom, so as to leave an annular space between the two flanges.

Q is a dome, preferably of rounded shape and having a base-flange $w$ resting on the flange $t$ of the cup or band N and secured thereto, as by screws $x$, there being preferably a series of angular lugs $y\,y$ projecting laterally from the dome-flange $w$ and engaging with the flange $v$ of the band P and secured thereto, as by screws $z\,z$. R represents an outlet extending from the center of said dome Q, said part R being shown as having also a small channel or passage $r'$ for the attachment of a steam-gage or safety-valve, as desired.

The outer wall $a$ of the casing A is shown in Fig. 1 as provided at one side with an opening $a'$, which is surrounded by a frame $b'$, to which is secured a valve-block S, which like the frame is preferably rectangular in outline and has a slot $c'$ therethrough. The valve-block has a water-inlet channel $d'$, a water-outlet channel $e'$, (leading to the space within the hollow annular casing A,) and a water-escape channel $f'$, none of which have any direct communication with each other in the block S, but only through the water-chamber $g'$ in the rocking valve T, which is pivotally secured to the block S by pivot $h'$.

U is a rock-shaft extending transversely through the slot $c'$ in the valve-block S and journaled in bearings $i'\,j'$, the inner end of said shaft projecting into the space in the hollow casing A between its walls $a\,b$ and above the top of the conical band E, said projecting end having rigidly secured thereto a float V, while from the outer end of said shaft U there projects downwardly an arm W, rounded at its lower end and in engagement with a notch $k'$ in the upper end of the valve T above its pivotal point.

X represents an inlet-pipe leading to the water-inlet channel $d'$, and Y an escape-pipe leading from the water-escape channel $f'$.

Z is a casing secured to the valve-block S by screws $m'\,m'$, which may also pass through the frame $b'$ and into the casing A, and thus secure all these parts together.

A' is a water-gage secured to the exterior of the casing A on the side opposite to the just-named valve-casing Z.

B' is a pipe or passage connecting the interiors of the casing A and pot B above the high-water line, and C' is an equalizing-pipe open at both ends, located in the space between the double walls of the casing A on the side opposite the valve T and communicating with an opening $n'$ in the upper wall $k$ of the annular band E.

In the operation of my invention for the generation of steam all of the hereinbefore-named parts are utilized, any desired form of fuel being burned beneath the pot B, and the pipe X being connected to any suitable source of water-supply. Water is admitted through pipe X into the water-inlet channel $d'$ in the valve-block S, and thence passes through the water-chamber $g'$ in the valve T to and through the water-outlet channel $e'$ in said block S into the space in the hollow casing A above the annular conical band E. The water then passes downward around the continuous spiral coil $i$ of said band E to the bottom of the casing A and through pipe L into the annular pot B and through pipes K J into the shell G, and thence passes upward around the coils $e$ and $f$ in the annular pot B and the coil $q$ in the shell G, and when the water rises to the desired level it will come into contact with the described float V and raise the latter, which will instantly rock the valve T through the rock-shaft U, so as to close the water-outlet channel $e'$ and open communication through the water-chamber $g'$ in said valve between the water-inlet channel $d'$ and water-escape channel $f'$, so that any further supply of water from the pipe X will at once escape through the pipe Y without entering casing A until sufficient of the water already in my said device has been converted into steam to permit the float V to drop and shift the valve T back to its former position, and hence admit more water into the casing A, and so on. As the water in the pot B and shell G is transformed into steam, the latter passes up into the chamber formed by the cup or band N and dome Q and out through the outlet R, from whence it is led by proper pipes to any desired point, the heated air in the annular passages between the inner wall of the casing A and the outer wall of the pot B and between the inner wall of said pot B and the shell G passing up between the band P and dome D and beneath the cup or band N and escaping out through the described annular space between the flange t of the band N and flange v of band P, and any steam generated in the lower part of the casing A will pass up out through the equalizing-pipe C' and pipe or passage B' into the steam-space in the pot B and mingle with the steam in said pot and pass out, together with the steam from the shell G, into the just-described chamber and through the outlet R, the said pipes B' C' serving to equalize the steam-pressure in the device at all times. Any sediment in the bottom of pot B and shell G can be readily removed through the drain-cock M.

When it is desired to utilize my invention as a water-heater simply, the valve-block S and valve T and their attachments and the equalizing-pipe C' and water-gage A' may be dispensed with, and, if desired, the described annular band E increased in height, so as to provide an additional number of turns to the continuous spiral coil i on said band. In such case, of course, the opening a' in the outer wall a of the casing A would be closed, as well as the opening n' in the top wall k of the annular band E, the latter then rising to the same height as that of the annular coil-shell C. In this arrangement the cold water may be admitted to either the lower part of the casing A—as, for example, at the point of the lower connection of the water-gage A', (shown in Fig. 1)—or at any convenient point in the upper part of said casing A, such as the point of the upper connection of said water-gage, and in the latter case the described pipe B' would not be used; but as these changes are simple matters of pipe connections within the skill of the mechanic I have not deemed it necessary to illustrate the same in the drawings. The water, whether admitted below or above the annular band E, would pass around all of the described coils in the casing A, pot B, and shell G and become highly heated and would all enter the chamber beneath the dome Q and pass out through the outlet R and be led by proper piping to the desired point, the continuous flat spiral water-channels between the turns of the continuous spiral coils resulting in affording large areas of heated surfaces of the casing A, pot B, and shell G, over which the water moves from its entrance to its exit, thereby heating the same with great economy of both time and fuel.

Having thus described my invention, what I claim as new, and desire to secure by Letters Patent, is—

1. The combination with a double-walled annular outer casing having an annular band provided with a continuous spiral coil secured therein, of a double-walled annular water-pot secured within said casing; a double-walled annular shell secured within and between the double walls of said pot, and provided with continuous spiral coils on the exterior surface of each wall forming fluid-tight joints between said double-walled pot and said annular shell; a single-walled shell supported within the central space of said annular pot, and provided with a continuous inner spiral coil; a water-inlet communicating with said outer casing; pipes connecting said annular pot with the outer casing and with the central shell; a chamber above and communicating with said annular pot and central shell, and an outlet leading from the upper wall of said chamber.

2. The combination with a double-walled annular outer casing, formed with a cylindrical outer wall, an inclined inner wall and closed top and bottom walls, and having an annular band provided with a continuous spiral coil secured therein, and a water-inlet communicating therewith, of a conical double-walled annular water-pot secured within said casing and connected thereto by a lower communicating water-pipe; a double-walled conical annular shell secured within and between the double walls of said pot and having continuous spiral coils on the exterior surface of each wall forming fluid-tight joints between said double-walled pot and said annular shell; a single-walled shell having an open top and closed bottom supported within the central space of said annular pot and provided with a continuous inner spiral coil, and a pipe connecting the lower end of said central shell with said annular pot; an annular dome closing the top of said annular pot and provided with openings; a cup or annular band having openings communicating with those in said annular dome and with the open top of the said central shell; a dome connected to said cup or annular band, forming therewith a fluid-chamber, and provided with an outlet; and another annular band, rising from said annular casing and surrounding said first-named annular band, but separated therefrom by an annular hot-air passage.

3. The combination with a double-walled closed outer casing having its lower part shut off from its upper part by the upper end of a continuous spiral coil secured therein, of a water-pot secured within said casing having a closed top and containing a close-bottomed shell located in said pot, and provided with a continuous spiral coil making fluid-tight joints with the said pot; a pipe connecting said outer casing with said pot above the top of the said coil-shell, and another pipe connecting said outer casing and said pot below the bottom of said coil-shell; a valve-block having three parallel vertical water-channels therein free from direct communication with each other, and one of said channels communicating with the interior of said outer casing above the top of the coil therein; a rocking valve pivotally secured to said valve-block and having a water-chamber adapted, as said valve is rocked, to connect the central water-channel in said block with the channel on one or the other side of said central channel; a rock-shaft having at its outer end a rigid arm in engagement with said rocking valve, and having its inner end projecting within said outer casing; a float rigidly secured to said inner end of the rock-shaft; water-inlet and water-escape pipes exterior to said outer casing and communicating with two of the said three channels in the valve-block; an equalizing-pipe located within said outer casing, and extending from the lower shut-off part to a point above the high-water line; a closed chamber located above said water-pot, and having openings in its lower wall in communication with corresponding openings in the closed top of said water-pot; and an outlet leading from said chamber.

4. The combination with a double-walled annular outer casing having an annular band provided with a continuous spiral coil secured therein, the upper end of said coil shutting off the lower part of said casing from its upper part, of a double-walled annular water-pot secured within said casing; a double-walled annular shell secured within and between the double walls of said pot and provided with continuous spiral coils on the exterior surface of each wall forming fluid-tight joints between said double-walled pot and shell; a single-walled shell supported within the central space of said annular pot, and provided with a continuous inner spiral coil, and having an open top and closed bottom; an annular dome closing the top of said pot and provided with a series of openings; a closed chamber located above said water-pot and having an outlet leading from its upper wall and openings in its lower wall communicating with those in said annular dome and with the open top of the said single-walled central shell; a water-inlet communicating with the upper part of said outer casing; an exterior valve controlling said inlet, and an interior float connected to and regulating said valve; pipe connections between the outer casing and annular pot, and between the said pot and central shell, below the respective coils in said parts; a pipe connection between said pot and outer casing above the respective coils therein; and an equalizing-pipe located within said outer casing, and extending from the lower shut-off part to a point above the high-water line.

In testimony that I claim the foregoing I have hereunto set my hand, at Milwaukee, in the county of Milwaukee and State of Wisconsin, in the presence of two witnesses.

EMANUEL DETWILER.

Witnesses:
H. G. UNDERWOOD,
B. C. ROLOFF.